United States Patent [19]
Mankins

[11] Patent Number: 5,740,830
[45] Date of Patent: Apr. 21, 1998

[54] TESTING OF PLUMBING INSTALLATIONS

[76] Inventor: John M. Mankins, 7320 Pinal Ave., Atascadero, Calif. 93422

[21] Appl. No.: 777,407

[22] Filed: Dec. 30, 1996

[51] Int. Cl.$^6$ ............... F16K 43/00; G01M 3/04; F16L 55/11
[52] U.S. Cl. ............... 137/15; 73/46; 73/49.1; 73/49.5; 73/49.8; 137/318; 138/90
[58] Field of Search ............... 4/679, 680, 681; 73/40.5 R, 46, 49.1, 49.6, 49.8, 49.5; 138/89, 90, 94; 137/247.47, 247.51, 318, 15

[56] References Cited

U.S. PATENT DOCUMENTS

| | | | |
|---|---|---|---|
| 396,177 | 1/1889 | Smith | 137/318 |
| 2,756,486 | 7/1956 | Smith | 137/318 |
| 3,335,742 | 8/1967 | Novak | 137/318 |
| 3,598,141 | 8/1971 | Yamo | 137/318 |
| 3,646,954 | 3/1972 | Hutton | 137/318 |
| 3,928,885 | 12/1975 | Peterson et al. | 15/104.3 |
| 4,128,107 | 12/1978 | Blumhardt | 137/318 |
| 4,429,568 | 2/1984 | Sullivan | 138/90 |
| 4,598,731 | 7/1986 | Colson | 137/318 |
| 4,626,142 | 12/1986 | Brin et al. | 408/81 |
| 4,936,350 | 6/1990 | Huber | 138/90 |
| 5,033,510 | 7/1991 | Huber | 138/90 |
| 5,044,393 | 9/1991 | Jiles | 137/318 |
| 5,163,480 | 11/1992 | Huber | 138/90 |
| 5,418,997 | 5/1995 | DeFrange | 15/104.31 |
| 5,620,020 | 4/1997 | Collins | 137/318 |

*Primary Examiner*—George L. Walton
*Attorney, Agent, or Firm*—Leo F. Costello

[57] ABSTRACT

A method and apparatus for testing a plumbing system in a more dependable and cost-effective manner. During the rough-in plumbing phase of construction, the drain pipe leading from the plumbing system in a building to the city sewer main or main sewer line is positively sealed off by a test cap welded in the pipe at the location of the clean-out. Access to the test cap is maintained through the clean-out. Pressurizing the rough-in plumbing to test the same can then proceed knowing that if any leaks occur, they are in the branch plumbing on the building side of the test cap, and not at or in the test cap. Following successful completion of the initial test, the top-out plumbing job is completed, leaving the test cap welded in the clean-out or drain pipe. After the roof vents are in, the second test of the plumbing system is made, again knowing that if the system shows any leaks, they are the result of a failure in the plumbing work and not a failure of the test cap. After the plumbing system has passed final test and inspection, a special tool or apparatus in accordance with the present invention is inserted down the clean-out to penetrate and ream-out the test cap, so that the drain pipe is opened and provides a passageway through which the waste can flow to the sewer line.

24 Claims, 5 Drawing Sheets

TESTING OF PLUMBING INSTALLATIONS

FIELD OF THE INVENTION

The present invention pertains to the testing of a plumbing installation and more particularly to a method for testing the integrity of a newly installed plumbing system and to a tool used in performing the method.

BACKGROUND

In residential house construction and as is well know, the plumbing is basically installed in three stages, namely, the rough-in plumbing, top-out plumbing and finish plumbing. The rough-in plumbing occurs prior to pouring of concrete. Top-out plumbing follows framing the building and involves installing pipes in the walls and vent pipes at extend up through the roof of the structure. Finish plumbing relates to setting toilets, sinks, and the like.

The rough plumbing includes laying a drain or waste pipe which leads from building to the city sewer main normally in the access street or road adjacent to the building. It is common practice to insert a clean-out in the drain pipe between pipes in building and the section of the drain pipe that leads to the sewer line. This clean-out may be located in a basement or, in a building without a basement, outside e building and underground. If underground, the clean-out has a branch extending to the surface of the ground for providing access to the drain pipe both during construction and during use of the building.

As is well know, in order to pass the rigid inspection normally imposed by building codes, it is necessary to test the drainage part of the plumbing system after the rough- in and top-out stages are finished. For this purpose, common procedures and devices are in use. The devices include test caps and inflatable test plugs, so-called water-weenies. In use, the test caps sealed at ends of all open and exposed branch pipes, and the inflatable test plugs are used in the clean-out where the passageway plugged is not as accessible. After the tests, the exposed test caps are punched out with a hammer, and the inflatable plugs are deflated and pulled out of the clean-out. Thus, the test plugs and the inflatable plugs can be removed without disassembling and disturbing tested system.

As indicated, the test caps in above-ground, accessible locations are usually knocked out a hammer, whereupon the fragments are pried out with a screwdriver or pliers. If a test cap were sealed in a clean-out, however, whether the clean-out is relatively accessible in a basement or whether it is underground, it cannot be punched out with a hammer and screwdriver without disassembling part of the system and thereby disturbing the tested system. Thus, test caps have not been used to block the test pressure in the drain pipe.

Instead, during the rough-in plumbing stage, the inflatable weenie-shaped, test plugs have been inserted in the clean-out, used for the tests, and subsequently removed with a pull chain attached to the plug and extending out of the clean-out. More specifically, to test the rough-in plumbing, the plug is inserted and inflated thereby sealing the drain pipe. The plumbing on the building side of the plug is then pressurized to check for leaks. After the top-out phase is completed, the plumbing is again tested by again inflating the plug, and pressurizing the system, usually by feeding water into the system through the vent pipes in the roof.

Use of such inflatable weenie plugs for the described testing has proved unsatisfactory for several reasons. The essential problem is that the plugs often leak although the plumbing may be entirely sound. Either the plug does not seal perfectly circumferentially within the pipe or the plug is punctured as it is being slid in or out of the clean-out and against the rough surfaces thereof. As a result, the test fails, not because of faulty plumbing, but because of a faulty plug. The plumbing crew will then need to be called back to the job to attend to the problem, causing aggravation and extra expense to the contractors and owners involved. Not only is there extra labor cost involved, but the failed inflatable test plugs must be replaced at considerable expense.

SUMMARY

A method and apparatus for testing a plumbing system in a more dependable and cost-effective manner is provided. During the rough-in plumbing phase of construction, the drain pipe leading from the plumbing system in a building to the city sewer main in the street is positively sealed off by a test cap welded in the pipe at the location of the clean-out. Access to the test cap is maintained through the clean-out. Pressurizing the rough-in plumbing to test the same can then proceed knowing that if any leaks occur, they are in the branch plumbing on the building side of the test cap and not at or in the test cap. Following successful completion of the initial test, the top-out plumbing is completed, leaving the test cap welded in the clean-out or drain pipe. After the roof vents are in, the top-out test of the plumbing system is made, again knowing that if the system shows any leaks, they are the result of a failure in the plumbing work and not a failure of the test cap. After the plumbing system has passed final test and inspection, a special tool constructed in accordance with the present invention is inserted down the clean-out to penetrate and ream-out the test cap, so that the drain pipe is at substantially its normal inside diameter and provides a relatively full opening through which the waste can flow to the city sewer main in the street.

An object of this invention is to provide an improved method for testing a newly installed plumbing system and a tool used in performing the method.

Another object is to provide a more cost effective method for testing a newly installed plumbing system in a building.

A further object is to avoid having to re-test a plumbing system that would have passed the initial test but did not only because the test plug failed.

An additional object is to be able to test a newly installed plumbing system without using inflatable test plugs, so-called water weenies, to seal off the drain pipe while doing the testing and thereby to avoid the expense of frequently having to replace faulty plugs.

Yet another object is to be able positively to seal off a drain pipe in a plumbing system while pressurizing the system to test the system for leaks.

A still further object is to be able to remove a test plug that has been bonded in a drain pipe in a location that is accessible only through a clean-out.

Another object is to provide a tool that can be extended into a clean-out and can cut out a plug that has been bonded in a fluid-tight manner in a drain pipe to which the clean-out is connected.

Another object is to be able from a remote position to maneuver and guide a cutting head of a tool inside a clean-out and into a position therein to ream out a test cap welded in the clean-out.

Another object is to provide a tool for cutting a test cap out of a clean-out and that is adapted to attach cutting heads of different sizes for different diameter pipes.

3

Another object is to provide a test cap-removing tool that is adapted to change its length depending on the distance between the test cap-to-be-removed and the location of the operation is of the tool.

Another object to provide a test cap-removing tool that cooperates with a clean-out to leverage the cutting head into a curing position and then allows the cutting head to ream out the test cap.

A further object is to enable a test plug that has been welded in fluid-tight relation in a drain pipe to be removed so that nearly the full diameter of the drain pipe is available for conducting material therethrough after the plug has been removed.

These and other objects and advantages of the invention will become apparent upon reference to the accompanying drawings and the following detailed description.

4

DETAILED DESCRIPTION

Figure 1:
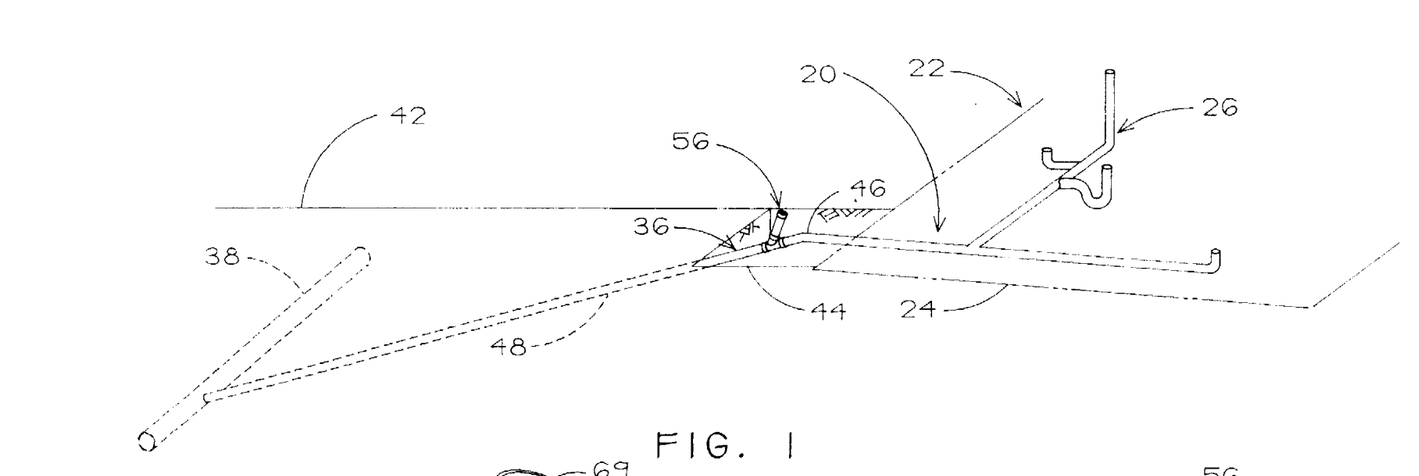
FIG. 1 is an isometric view showing a schematic representation of a plumbing installation in a residential building construction that is intended to represent the plumbing installation after the rough-in plumbing or first stage of the plumbing installation has been completed and during which a clean-out is installed in a drain pipe leading from the building to a public sewer line.

Prior to describing the method and apparatus of the present invention, reference will be briefly made to the environment in which the invention is used. Thus, in FIG. 1, a plumbing system is schematically shown and generally indicated by the numeral 20 in a residential building construction 22, with the plumbing system being represented at the rough plumbing stage. Only the foundation area 24 and a few of the interior pipes 26 of the plumbing system are shown thereby indicating that only the basic pipes have been installed and that none of the finish plumbing is in nor are the appliances installed.

During the rough-in plumbing stage (FIG. 1), a drain pipe 36 is connected between the interior plumbing 26 and a city sewer main or public sewer line 38 which usually runs underneath the street or road in front of the construction 22. The drain pipe is typically made of a plastic such as ABS or PVC, but it may be cast iron or copper or other suitable material. For drainage purposes, the pipe usually has a three- or four-inch diameter and is laid with enough slope to enable drainage. As is well known, the ground 42 around the construction is excavated to provide a large trench or open area 44 below normal ground level so the drain pipe can be connected to the sewer line. The drain pipe has an upper section 46 connected to the interior plumbing and a lower section 48 connected to the sewer line.

Figure 2:
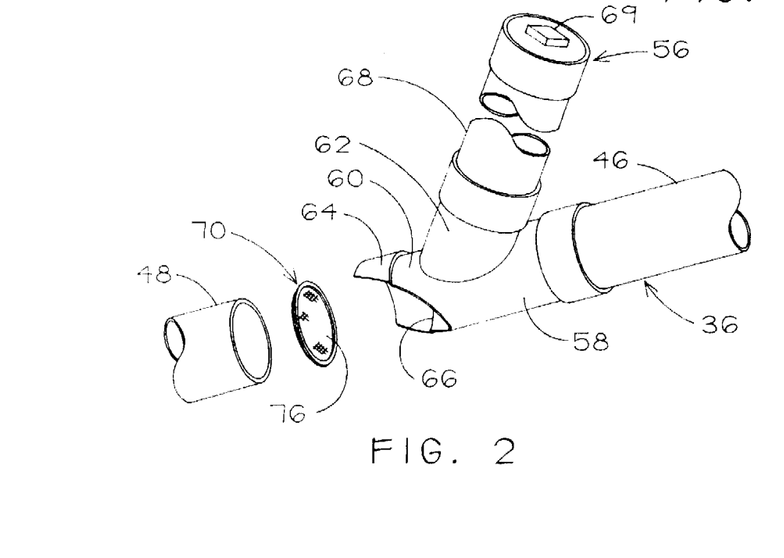
FIG. 2 is an enlarged exploded isometric view of a part of FIG. 1, showing fragments of upper and lower sections of the drain pipe, showing the clean-out with a branch thereof (partially broken away) to be connected to the lower section of the drain pipe, and showing a test cap to be connected to the lower section between the section and the branch of the clean-out.
Figure 3:
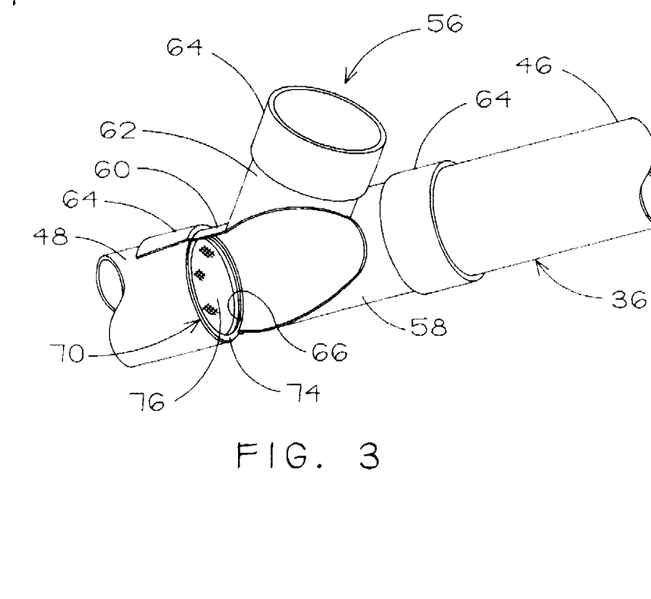
FIG. 3 is a still further enlarged view similar to FIG. 2 but with the parts assembled, thereby showing the clean-out connected between the upper and lower sections of the drain pipe and showing the test cap connected to the lower section between that section and the clean-out so as to block flow through the clean-out from the upper section of the drain pipe to the lower section thereof.
Figure 4:
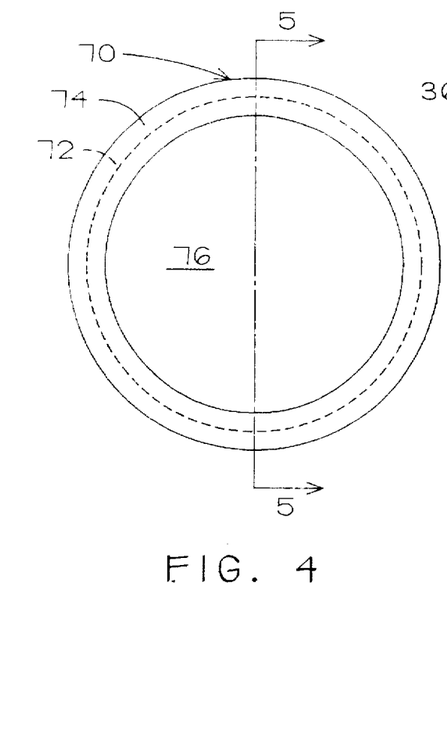
FIG. 4 is a still further enlarged end view of the test cap shown in FIGS. 2 and 3 as seen from the upstream end of the cap.
Figure 5:
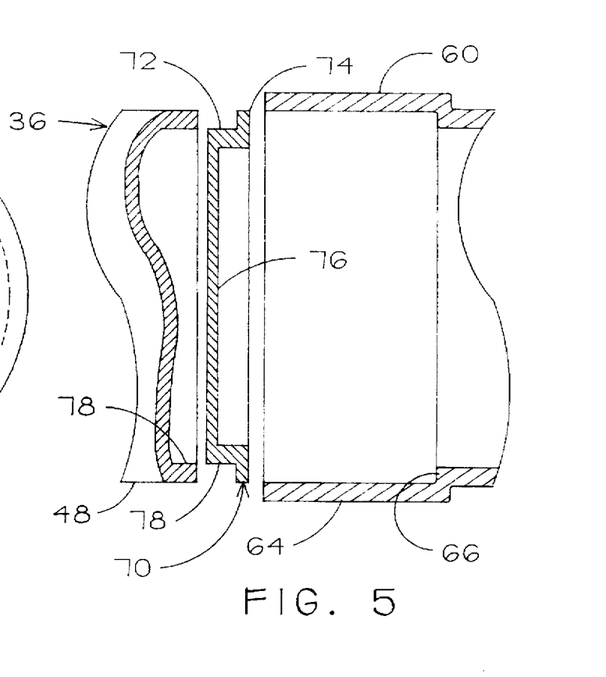
FIG. 5 is an exploded longitudinal diametrical section of the test cap taken on a plane indicated by line 5—5 of FIG. 4 but showing the test cap between the drain pipe and the clean-out and illustrating how these three parts will interfit when assembled.

A three-way clean-out 56 (FIGS. 1, 2 and 3), usually of the same material as the drain pipe 36, has inlet, outlet and clean-out branches 58, 60 and 62, each having a collar 64 and an annular shoulder 66. The collars of the inlet and outlet branches are respectively slid over and cemented to the upper and lower sections 46 and 48 of the drain pipe with the shoulders of the clean-out normally abutting the ends of the pipe sections. A riser 68 is connected to the clean-out branch and extends above the surface of the ground 42, and a clean-out cover 69 is releasably connected to the riser for sealing and closing this branch when necessary.

As is well-known, building codes typically require plumbing installations for new construction to be tested for leaks twice: after the rough-in plumbing is in and after the top-out plumbing is completed. It is currently standard practice to insert an inflatable plug, not shown, down the clean-out branch 62 and into the outlet branch 60, to inflate the plug, and thus to block the drain pipe 36 so the plumbing system can be pressurized for leaks. Since such plugs have not been satisfactory as discussed above, the principles of the present invention involve conducting the tests differently.

In accordance with the method of the present invention and as part of the rough-in plumbing phase (FIGS. 1–5), a test cap or plug 70 of well-known construction is fitted in and connected to the lower section 48 of the drain pipe 36, and then the clean-out 56 is connected between and joins the upper and lower sections 46 and 48 of the drain pipe. The test cap has an annular body 72, an annular flange 74 extending radially outwardly from the body, and a circular center plate 76 filling the body.

Test caps, as 70 (FIGS. 2 through 5), suitable for the purposes of the present invention are sold by the PASCO Company of 11156Wright Road, Lynwood, Calif. 90262, as part Nos. 4844 and 4845. These caps are of plastic material capable of being solvent-welded to ABS or PVC pipe, and are also commonly referred to as knock-out plugs. They are available in various sizes so that their annular bodies 72 can be fitted in three- or four-inch diameter drain pipes 36.

As above stated and during the rough-in plumbing stage, the test cap (FIGS. 2 and 5) is fitted in the lower section 48 of the drain pipe with the body 72 received within the pipe, the flange 74 engaging the end of the pipe, and the center plate 76 disposed transversely of and within the pipe. Prior to making this assembly, layers of a suitable bonding cement are applied as at 78 to the mating surfaces so as to solvent-weld the parts together in the described assembly. After the test cap is welded in place (FIG. 13), the collar 64 of the outlet branch 60 of the clean-out is slipped over and solvent-welded to the lower section of the drain pipe with the shoulder 66 of the outlet branch abutting the radial flange 74 of the test cap. The resulting connection (FIG. 3) of the test cap in the drain pipe effects a fluid-tight seal that will block flow through the pipe. Either before or after this connection, the inlet branch 58 of the clean-out is connected to the upper section 46 of the drain pipe.

Following the described assembly (FIGS. 1 and 3) of the test cap 70, the clean-out 56, and the upper and lower sections 46 and 48 of the drain pipe 36, the rough-in plumbing is subjected to a first pressure test. Such pressurization is accomplished in a well-known manner that includes introducing water into the system through an open end of a pipe in the interior plumbing 26. It is of course understood and well known that all open ends of the pipes in the system 20 are plugged including attaching the clean-out fitting 69 to the riser 68 of the clean-out branch 62. Such pressurization imposes fluid pressure on the upstream side of the test cap on the side thereof opposite from the sewer line 38. Since the test cap is bonded in fluid-tight relation within the drain pipe, no leaks will occur through or around the test cap. As a result, if there is any loss of pressure in the plumbing system, it will clearly be in the plumbing system itself and not in the plugging of the drain pipe by the test cap, as contrasted with the frequent leaks of the inflatable test plugs, as described above.

Figure 6:
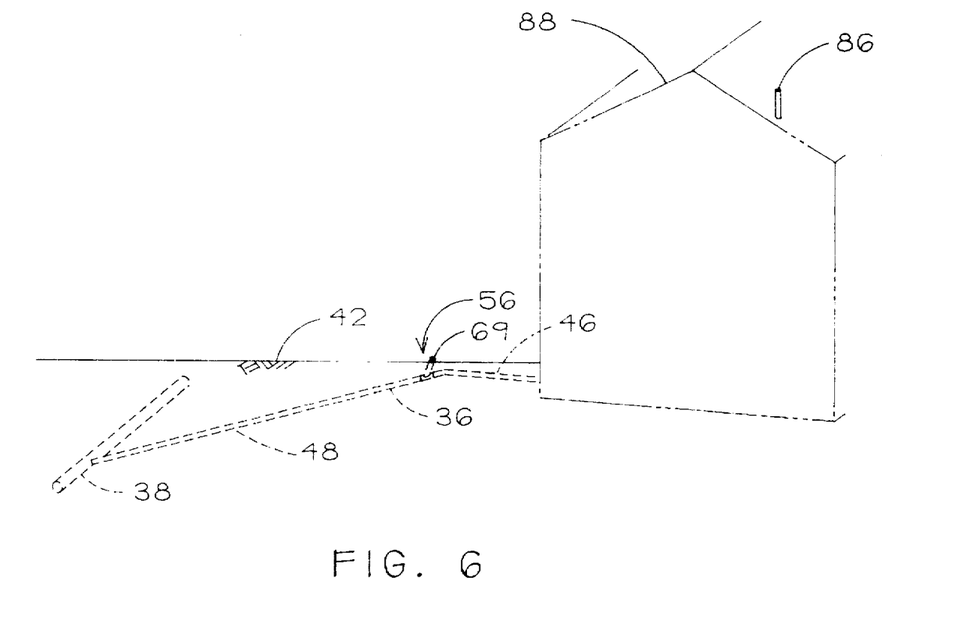
FIG. 6 is a view similar to FIG. 1 but on a reduced scale and intended to represent the plumbing system after the second or top-out stage thereof has been completed.
Figures 7, 8, 9, 10:
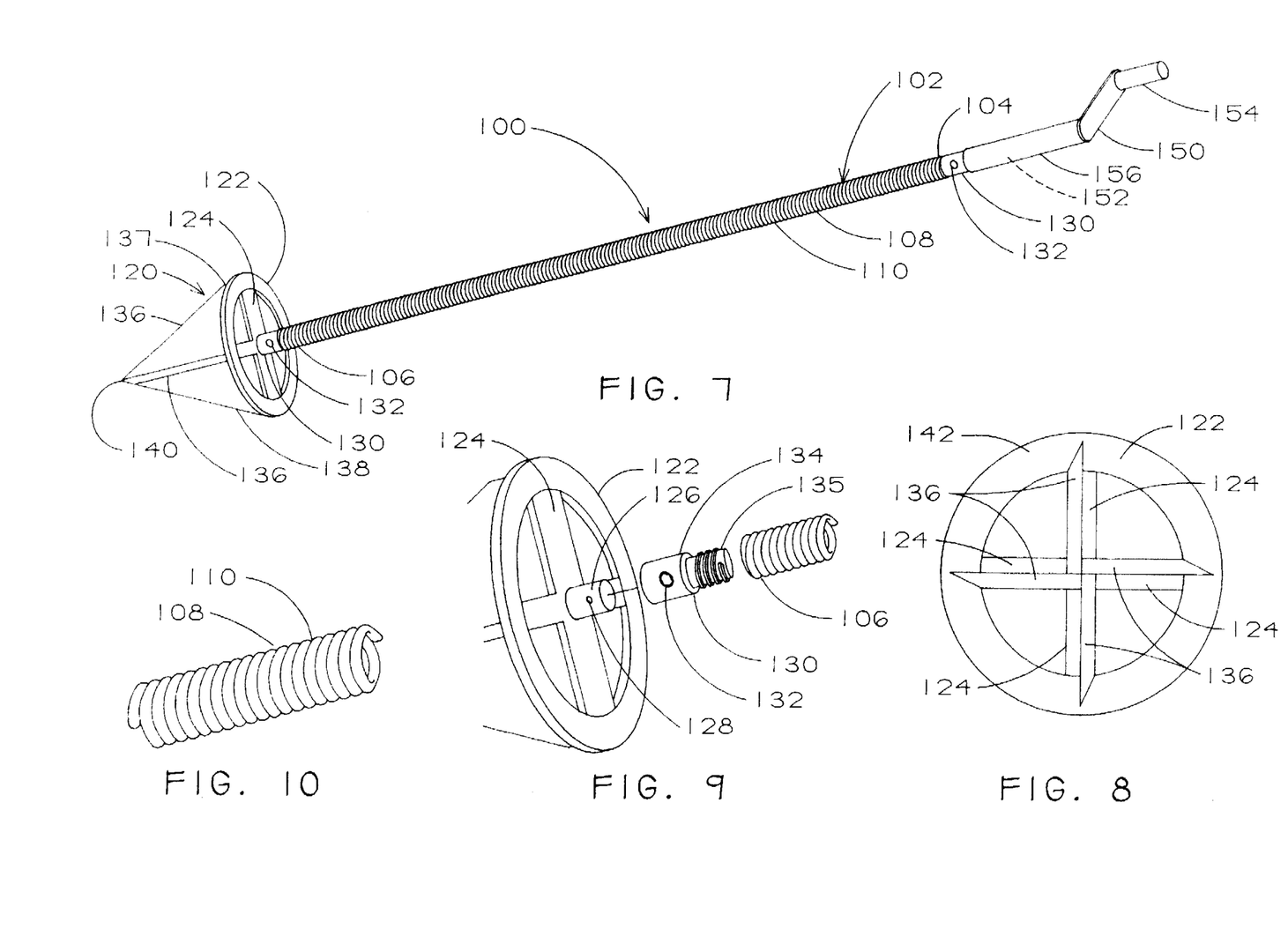
FIG. 7 is an isometric view of a tool used in carrying out the method of the present invention and including a cutting head, a flexible shaft, and handles.
FIG. 8 is an enlarged end view of the cutting head of the tool shown in FIG. 7.
FIG. 9 is an enlarged, exploded, isometric view of the tool of FIG. 7 with the head and shaft being fragmentary and showing how the cutting head is releasably connected to the shaft.
FIG. 10 is an enlarged isometric view of the shaft showing the turns of the coil spring construction of the shaft.
Figure 11:
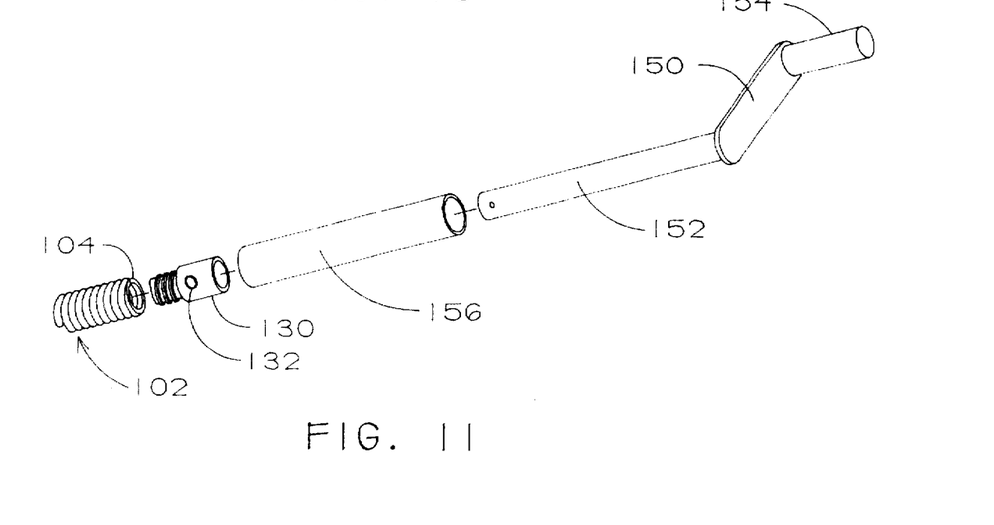
FIG. 11 is a reduced exploded isometric view of the tool of FIG. 7 and showing how the handles are connected to the shaft.

After the plumbing system 20 has passed the initial test at the rough-in plumbing stage, construction of the building continues (FIG. 6) including completion of the top-out plumbing job. This involves installation of one or more roof vents, as 86, extending up through the roof of the building, represented at 88. As part of finishing the construction, the ground 42 around the building is filled and graded, leaving the riser 68 exposed above ground level to allow access to the clean-out 56.

During the completion of the building 88 (FIG. 6), the test cap 70, the clean-out 56 and the drain pipe 36 are not disturbed and thus remain connected in the described relationship (FIG. 3) After the top-out stage is completed, a second test of the plumbing system 20 is conducted by again pressurizing the system 20 but this time typically by feeding water with a hose through an open roof vent, as 86. Once more, the test cap absolutely blocks flow through the drain pipe so that if there are any leaks in the system, they will be in the system and not in the plug in the drain pipe. If the system is sound, only one additional test is needed, but of course if there are leaks, they must be repaired and the test repeated until all problems are corrected.

Following successful passage of the second or final test or tests, however, it is of course necessary to remove the blockage caused by the test cap 70. In accordance with the principles of the present invention, the blockage is removed by a special plumbing tool 100 (FIGS. 7-11 ). This tool includes an elongated flexible shaft 102, preferably about four feet long and preferably about ¾" in diameter, and having upper and lower ends 104 and 106. In the disclosed embodiment, the shaft is a tightly wound coil spring 108 (FIG. 10) made of wire, the adjacent turns 110 of which are in close engagement when the shaft is unflexed, thereby imparting a measure of rigidity to the shaft notwithstanding its flexibility. Coil springs, as 108, suitable for the shaft of the present invention are sold as part No. 9504 by the Marco Products Company of Sylmar, Calif. Alternatively, other types of flexible shafts or cables with a measure of rigidity can be employed.

Figure 13:
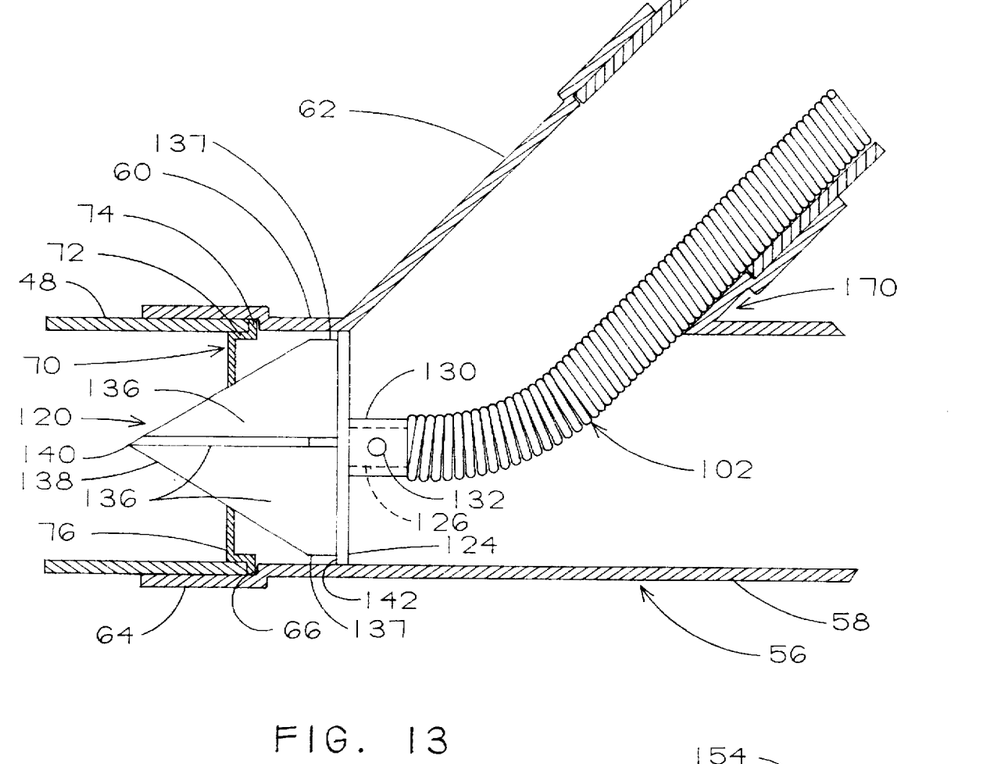
FIG. 13 is an enlarged fragmentary, vertical longitudinal section of the clean-out and part of the lower section of the drain pipe and showing the tool with its cutting head in cutting engagement with the center plate of the cap.

The plumbing tool 100 (FIGS. 7-11) also includes a cutting head 120 with a conical configuration releasably attached to the lower end 106 of the tool shaft 102. The cutting head has a mounting ting 122 disposed perpendicularly of the axis of the shaft when the shaft is straight and unflexed as in FIG. 7, a cruciform mounting bracket 124 secured within the ring, and a hub 126 extending from the bracket axially of the ring. The outside diameter of the mounting ring is of a dimension suitable for the size of clean-out 56 being used so that the ring will slidably and rotatably fit within the clean-out (FIG. 13). A lower coupling 130 (FIG. 9) is connected to the lower end 106 of the spring shaft, is fitted over the hub, and is fastened thereto by a set screw 132 on the coupling.

More specifically, the lower coupling 130 (FIG. 9) has a female sleeve 134 that slips over the hub 126. The hub has a hole 128 that is aligned with and receives the set screw 132 to secure the coupling to the mounting ring 122. The lower coupling also has a threaded male stub 135 that threads into the lower end 106 of the spring shaft 102 thereby to secure the coupling to the shaft. It will be understood that the coupling 130 allows different sizes of cutting heads 120 to be connected to the tool shaft depending on the diameter of the drain pipe involved.

The cutting head 120 (FIGS. 7, 8, and 13) also has a plurality of triangular cutting blades 136 rigidly secured to and projecting endwardly from the mounting ring 122 and bracket 124. Four blades are used in the disclosed embodiment and are positioned in the four quadrants of the mounting ring and bracket with the base edges of blades welded to the mounting ring and bracket and the altitude edges of the four blades welded together along the axis of the ring. The blades have axial guiding edges 137 and cutting edges 138 converging to a sharp point or tip 140 of the cutting head. The base edges are set radially inwardly (FIGS. 8 and 13) of the outside diameter of the mounting ring to leave an annular stop rim 142 circumscribing the blades adjacent to the mounting ring for a purpose to be described. When the tool shaft 102 is straight and unflexed (FIG. 7), the tip of the cutting head projects endwardly from and in coaxial alignment with the shaft.

In addition, the plumbing tool 100 (FIGS. 7 and 11) has a handle 150 that includes a crankshaft 152 connected to the upper end 104 of the tool shaft 102 and a crankhandle 154 projecting from the crankshaft. The crankshaft is connected to the tool shaft by an upper coupling 130 and set screw 132 in the same manner as the cutting head 120 is connected to the tool shaft, as described above. The handle also includes a holding sleeve 156 rotatably received on the crankshaft between the upper end of the upper coupling and the crankhandle.

It is to be noted that the length of the tool shaft 102 can be changed by connecting sections of springs, as 108, for example each about two feet in length, together by intermediate couplings, not shown, but similar to the upper and lower couplings 130. As contrasted with the upper and lower couplings, however, the intermediate couplings have threaded male stubs at both ends for threading into adjacent open ends of adjacent springs. Thus, by having a supply of the spring sections and the intermediate couplings, the shaft can be made longer or shorter to suit particular jobs. Also, although the shaft in disclosed embodiment is a single length of spring preferably about four feet long, it may be made up of shorter lengths of springs (for example, and as above noted, each about two feet long) equaling four feet or any other desired length.

The plumbing tool 100 (FIG. 7) is held by grasping the sleeve 156 in one hand and the crankhandle 154 in the other hand. The tool shaft 102 and thus the cutting head 120 are rotated by turning the crankhandle while holding the sleeve. Also, the tool shaft has sufficient rigidity to allow force to be transmitted through and axially of the shaft to the tip 140 by grasping the sleeve in one hand and the crankhandle in the other and thrusting the tool axially of the tool shaft. Such rotation and axial thrusting can be accomplished at the same time whether the tool shaft is straight or flexed.

Figure 12:
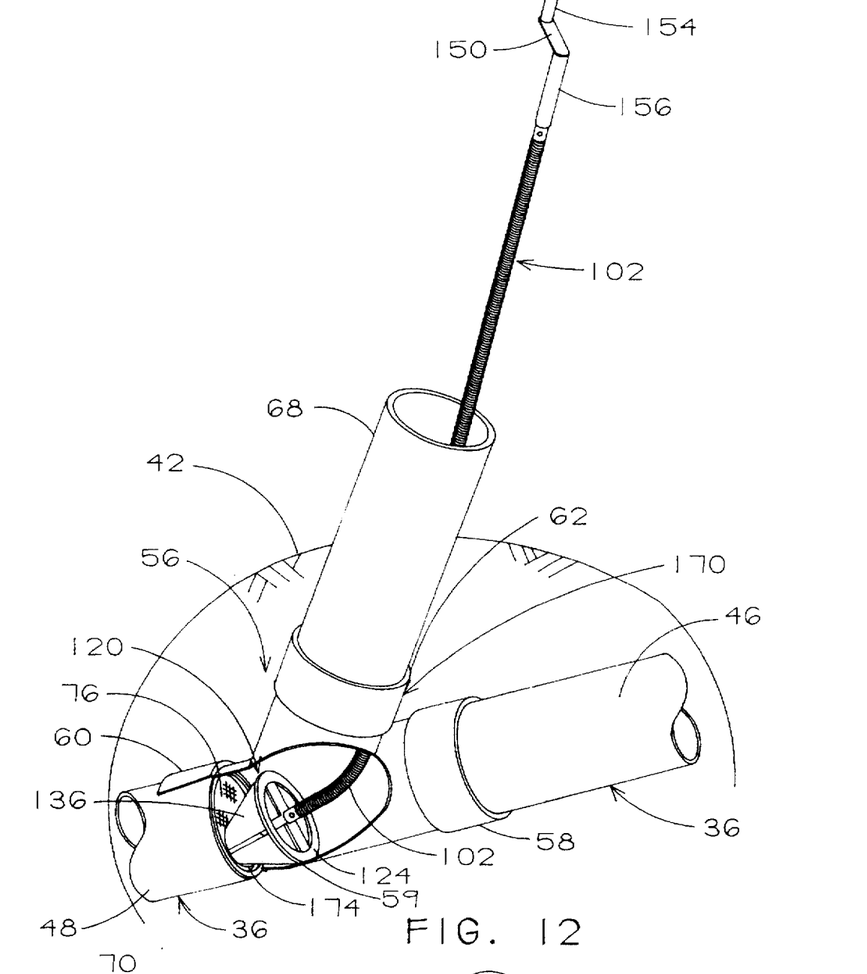
FIG. 12 is an isometric view similar to and on the same scale as FIG. 3 with an extension pipe connected to the clean-out, with the tool of FIG. 7 extended into the clean-out, and with part of the clean-out broken away to show the cutting head of the tool in cutting engagement with the center plate of the test cap.

The plumbing tool 100 is used to carry out the method of the present invention after all necessary pressure tests have been successfully completed. To this end, the cover 69 (FIG. 6) is removed and the cutting head 120 of the tool is inserted in the riser 68 (FIG. 12) and lowered down into the clean-out 56. The mounting ring 122 slidably engages the interior of the riser and the clean-out branch 62 and guides the cutting head down the clean-out until it exits the clean-out branch and strikes the base 59 of the clean-out (FIG. 12). Axial thrust is then imparted to the tool shaft 102 to cause the cutting head to tip over from a generally vertical attitude, not shown, into the generally horizontal attitude shown in FIG. 12, with the mounting ring engaging the base of the clean-out and the tip 140 pointing toward the test cap 70. Such tipping is facilitated by the flexibility of the shaft and the engagement of the shaft with the clean-out branch along area 170, but also by the downward slope of the drain pipe 36.

When in this generally horizontal position (FIGS. 12 and 13), further axial pressure on the tool shaft 102 causes the cutting head 120 to move axially downwardly of the drain pipe 36 toward the outlet branch 60. Because of the combined flexibility and rigidity of the tool shaft and the leveraging effect of the shaft bearing against the clean-out branch 62 and/or the riser 68 at region 170, this axial pressure on the tool shaft causes the tip 140 of the cutting head to move into engagement with the center plate 76 of the test cap 70. Then, the shaft is thrust sharply downwardly to force the tip of the cutting head to penetrate the plate, creating an initial hole 174 (FIG. 12) in the plate.

Figure 14:
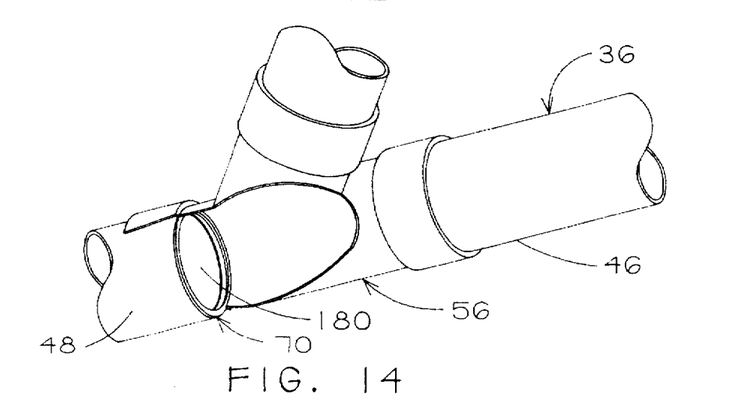
FIG. 14 is a view similar to FIG. 12 but with the tool removed and with the clean-out broken away to show how the cutting head has completely removed the center plate of the test cap thereby to open the drain pipe for movement of drain materials therethrough.

Thereafter, while continuing to apply axial downward pressure on the tool shaft 102 (FIG. 13), the tool shaft and the cutting head 120 are rotated with the crankhandle 154 to begin cutting away the center plate. The mounting ring 122 is soon rotatably slidably received in the outlet branch 60 and thereafter guides movement of the cutting head axially along the outlet branch. As the cutting action continues, the guiding edges 137 move within the annular body 72 of the test cap 70 to guide and center the cutting head. When the stop rim 142 strikes the radial flange 74, the cutting blades will have substantially completely cut or reamed out the center plate 76 from within the annular body 72 of the test cap to provide a large opening 180 (FIG. 14) in the test cap. This opening 180 is the about the same diameter as the inside diameter of the body since the diameter of the cutting head at the guiding edges 137 is the about the same diameter as the inside diameter of the body. In turn, the inside diameter of the body is just slightly less than the inside diameter of the drain pipe, so that creating the opening 180 will allow waste material to move essentially unimpeded through the pipe.

After the opening 180 has been created, the tool 100 is pulled back out of the outlet branch 60 and thence out of the clean-out branch 62 and riser 68. Because the stop rim 142 contacts the radial flange 74 of the test cap 70, the cutting head 120 does not hang-up or become locked in the clean-out. It is also to be noted that the cut fragments, not shown, of the center plate are subsequently flushed down the lower section 48 of the drain pipe to the sewer line 38.

From the foregoing it will be understood that an improved method for testing a newly installed plumbing system has been provided including a tool 100 used in carrying out the method. The method is more cost-effective because it avoids having to re-test a plumbing system 20 that would have passed the test but did not only because the test plug failed. Since the method does not use inflatable test plugs to seal off the drain pipe 36 while doing the testing, the common failure of the inflatable plug does not cause a failed test. Instead, the method involves use of a test cap which positively seals the drain pipe and allows an accurate test of the plumbing system. The test cap and its positive seal can be employed because the method also uses the tool 100 that can be extended into the clean-out and operated from a remote position to cut an opening 180 in the cap and remove the blockage from the pipe. It will be recognized that although the method and tool have been described and shown with an underground clean-out, they can be used equally as well when the clean-out is in a basement or otherwise above ground.

Although a preferred embodiment of the present invention has been shown and described, various modifications and substitutions may be made thereto without departing from the spirit and scope of the invention. Accordingly, it is to be understood that the present invention has been described by way of illustration and not limitation.

What is claimed is:

1. A method of testing a plumbing system in a building using a standard test plug, said system being adapted to be connected to a sewer line by a drain line, comprising the steps of:

installing the plumbing system in the building including providing a drain line between the plumbing system and the sewer line;

installing a standard test plug in the drain line thereby to prevent flow through the line past the plug;

testing the plumbing system by applying fluid pressure in the plumbing system on the opposite side of the plug from the sewer line and against the plug thereby to test the plumbing system for leaks; and     removing a portion of the plug disposed within a portion of the drain pipe, thereby creating an opening through the plug while the drain pipe remains connected to the sewer line, thereby allowing flow through the drain line and causing the removed portion of the plug to be flushed down the drain line to the sewer line.

2. The method of claim 1,
wherein the removing step involves cutting said portion out of the plug.

3. The method of claim 1,
wherein the installing step involves causing the plug to be inaccessible except through an access opening leading to the plug whereby access to the plug can be achieved without disconnecting the drain pipe from the plumbing system or the sewer line; and
wherein the removing step involves extending a tool through the access opening for engaging the plug and causing said portion to be forced into the drain line on the opposite side of the plug from the tool.

4. The method of claim 3 wherein the tool includes an elongated flexible shaft having opposite ends, a cutting head attached to one end of the shaft, and an operating handle attached to the opposite end of the shaft,
wherein the removing step involves extending the cutting head and the shaft through the access opening to move the cutting head into engagement with the plug and thereafter rotating the head against the plug by turning the handle thereby to ream out said portion of the plug.

5. The method of claim 4,
wherein the removing step involves reaming out said portion of the plug so that the opening through the plug is of substantially the same diameter as the drain line and provides for substantially smooth movement of drainage material through the drain line.

6. The method of claim 1 wherein the plug is of plastic material:
wherein the installing step includes installing a first stage of the system including the drain line;
wherein the installing step includes welding the plug in fluid-tight relation in the drain line during installation of the first stage;
wherein the testing step includes applying a first test of fluid pressure in the plumbing system after the first stage is installed;
wherein the installing step further includes installing a second stage of the plumbing system;
wherein the testing step further includes applying a second test of fluid pressure in the plumbing system to test the plumbing for leaks after the second stage is installed; and
wherein the removing step includes cutting said portion out of the plug only after the second test pressure has been removed.

7. The method of claim 6,
wherein the installing step involves leaving the portion of the drain line that contains the plug exposed during said first stage;
wherein the installing step involves covering the portion of the drain line that contains the plug during said second stage while providing an access opening to the plug without disconnecting the drain line from the plumbing system or the sewer line; and
wherein the removing step involves cutting said portion out of the plug through the access opening.

8. The method of claim 7,
wherein the drain line includes a drain pipe having an upper section connected to the remainder of the plumbing system and a lower section adapted to be connected to the sewer line;
wherein the installing step involves joining the upper and lower sections of the drain pipe with a clean-out that has inlet and outlet branches respectively attached to the upper and lower sections of the drain pipe and constituting part of said drain line and a clean-out branch in fluid communication with the inlet and outlet branches;
wherein the installing step involves welding the plug in the drain line adjacent to the lower section of the drain pipe before the outlet branch of the clean-out is connected to the lower section;
wherein the plug is accessible from outside the plumbing system through the clean-out branch; and
wherein the removing step is performed through the clean-out branch of the clean-out.

9. The method of claim 1,
wherein said fluid presssure is relieved before the removing step occurs.

10. A method of using a tool to cut out a circular center plate of a test cap for a plumbing system; wherein the test cap has a cylindrical body circumscribing the plate and an annular flange extending radially outwardly from the body; wherein the plumbing system has a clean-out with first and second branches positioned between sections of a cylindrical drain pipe leading to a sewer line; wherein the test cap is secured in fluid-tight relation to one of said sections of the drain pipe whereby the test cap creates a fluid-tight seal against passage of material through the drain pipe to the sewer line, said first branch of the clean-out providing communication with the test cap; wherein the clean-out has a third branch extending laterally from the drain pipe and provides access to the center plate through the third branch and the first branch; wherein the tool includes a rotary cutter, an elongated flexible shaft connected to the cutter, and means for rotating the shaft to rotate the cutter, comprising the steps of:
inserting the cutter and the shaft into the third branch of the clean-out until the cutter engages the first branch of the clean-out;
pressing axially on the shaft to bend the shaft adjacent to the cutter and force the cutter into engagement with the center plate of the test cap; and
rotating the shaft and thus the cutter to cause the cutter to cut the center plate out of the test cap and to create an opening in the test cap substantially the same diameter as the body of the cap so as to communicate with the drain pipe, whereby material intended to be moved through the drain pipe to a sewer line is no longer blocked by the test cap.

11. The method of claim 9 wherein the cutter has a diameter at least equal to the inside diameter of the drain pipe,
wherein the rotating step is continued until the cutter engages the inside diameter of the drain pipe whereby the center plate and the body of the test cap are substantially completely removed thereby to provide a substantially uniform diameter through the drain pipe.

12. A tool for cutting an opening through a test cap that is secured in a drain line to block flow therethrough and wherein a clean-out branch connected to the drain line provides access to the cap after a plumbing test has been completed, comprising:
a cutting head including means for reaming an opening through the test cap;

resiliently flexible shaft means connected to the cutting head for extending the head into the clean-out branch and into engagement with the test cap, said shaft means being capable of flexing in the clean-out branch and a portion of the drain line to enable the engagement with the test cap; and means for rotating the shaft means while in such flexed condition to rotate the cutting head while forcing it against the test cap thereby to cause the cutting head to ream out the opening in the cap so that the drain line is open and provides a passageway through which waste water can flow to a sewer line.

13. The tool of claim 12, wherein the cutting head has an axis of rotation and includes a plurality of blades radially extending from the axis in circumferentially spaced relation to each other, said blades converging in a conical configuration toward a tip of the head.

14. The tool of claim 12, wherein the cutting head has means for guiding it axially within the clean-out.

15. The tool of claim 12, wherein the cutting head has means for guiding it axially of the test cap while the head is reaming out the opening.

16. The tool of claim 12, wherein the shaft means is releasably connected to the cutting head.

17. The tool of claim 12, wherein the cutting head has means for limiting movement thereof within the test cap while the head is reaming out the opening.

18. The tool of claim 12, wherein the shaft means is a flexible shaft.

19. The tool of claim 18, wherein the shaft is about four feet in length.

20. The tool of claim 18, wherein the flexible shaft is a coil spring.

21. The tool of claim 12, wherein the shaft means has means for bearing against the clean-out thereby to guide and leverage the cutting head into engagement with the plug.

22. The tool of claim 12, wherein the rotating means includes a handle connected to the shaft means at the opposite end thereof from the cutting head.

23. A tool for cutting out the center plate of a test cap in a drain pipe and blocks flow therethrough and wherein a clean-out connected to the drain pipe provides access to the cap after a plumbing test has been completed, comprising:

a cutting head including means for reaming an opening through the test cap;

shaft means connected to the cutting head for extending the head into the clean-out branch and into engagement with the center plate of the test cap within a portion of the drain pipe, and means for rotating the shaft means to rotate the cutting head while forcing it against the center plate of the test cap, thereby to cause the cutting head to ream out the center plate and to create the opening therein, wherein the shaft means has a longitudinal axis;

wherein the shaft means is resiliently flexible;

wherein the shaft means has a normally straight unstressed condition but can be flexed out of the straight condition upon application of sufficient force; and wherein the shaft means can transmit force axially thereof whereby the cutting head can be forced against and through the center plate of the cap by applying force on the shaft means axially thereof toward the cutting head while rotating the cutting head.

24. A method of using a tool to cut out a center plate of a test cap for a plumbing system; wherein the test cap has annular body circumscribing the plate; wherein the plumbing system has a clean-out element with a first section secured between sections of a drain pipe; wherein the test cap is secured in fluid-tight relation in and to one of said sections of the drain pipe whereby the test cap creates a fluid-tight seal against passage of material through the drain pipe; wherein the clean-out element has a second section extending from the drain pipe and provides access to the center plate through the second section after a plumbing test has been completed; wherein the tool includes a rotary cutter, an elongated flexible shaft connected to the cutter, and means for rotating the shaft to rotate the cutter, comprising the steps of;

inserting the cutter and the shaft into the second section of the clean-out element until the cutter engages the first section of the clean-out element;

pressing axially on the shaft to bend the shaft adjacent to the cutter and force the cutter into engagement with the center plate of the test cap within a portion of the drain pipe; and rotating the shaft and thus the cutter to cause the cutter to cut an opening in the center plate of the test cap for communication with the drain pipe, whereby material intended to flow through the drain pipe to a sewer line is no longer blocked by the test cap.

* * * * *